UNITED STATES PATENT OFFICE 2,224,388

VULCANIZATION OF RUBBER AND PRODUCT OBTAINED THEREBY

Marion W. Harman, Nitro, W. Va., assignor to Monsanto Chemical Company, St. Louis, Mo., a corporation of Delaware No Drawing. Application April 16, 1936,
Serial No. 74,780

11 Claims. (Cl. 260—785)

The present invention relates to new vulcanization accelerators, to a process of vulcanizing rubber and to the vulcanization products obtained with the aid of the said new vulcanization accelerators.

The new and preferred class of rubber vulcanization accelerators comprise the reaction products obtainable by interacting a mercapto-thiazole, formaldehyde and a polynuclear aromatic hydroxide, said nuclei having at least two carbon atoms in common. The accelerators of this invention are believed to possess the following structural formula

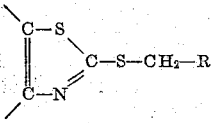

where R is a polynuclear aromatic hydroxide, said nuclei having at least two carbon atoms in common, although the invention is not to be understood as limited by any formulae or theories as to the structure of the perferred class of compounds.

The preferred class of materials may be employed alone as accelerators, but are preferably employed in conjunction with other organic accelerators as activators thereof, and more particularly in conjunction with organic nitrogen containing vulcanization accelerators as activators thereof, such for example as diphenyl guanidine, di ortho tolyl guanidine, hexamethylenetetramine, Schiff's bases, cyclohexylamine, guanidine salts, for example diphenyl guanidine phthalate, diphenyl guanidine acetate, diphenyl guanidine formate and analogues and equivalents thereof.

As typical examples of mercapto-thiazoles which are reactive with formaldehyde and a polynuclear aromatic hydroxide having at least two carbon atoms in common to form therewith the new class of vulcanization accelerators are 2-mercapto-benzo-thiazole, 2-mercapto-naphtha-thiazole, 2-mercapto-6-nitrobenzo-thiazole, 2-mercapto-5-chlorbenzothiazole, 2-mercapto-4-methyl-benzo-thiazole and the analogues and equivalents thereof. As typical examples of aromatic hydroxides employed in the preparation of the preferred new class of accelerators are alpha naphthol, beta naphthol, 8-hydroxy quinoline, 3-hydroxy 2-naphthoic acid and analogues and equivalents thereof.

The following specific examples are to be understood as illustrative embodiments of the invention and not in any sense limitative of the scope thereof.

EXAMPLE I 22.3 parts by weight of 37% formaldehyde solution (0.275 mol) are dissolved in a convenient solvent, for example 100 parts by weight of ethyl alcohol, and the solution made neutral to phenolphthalein indicator. 44 parts by weight of mercapto-benzo-thiazole having a purity of 95.2% (0.25 mol) are dissolved in said formaldehyde solution and 36 parts by weight of beta naphthol (0.25 mol) are added and the whole agitated and heated preferably to refluxing temperature for a convenient period of time, for example 15 hours. On allowing the reaction mass to cool to room temperature, the solid product comprising the preferred reaction product is filtered off and, if desired, may be purified in a convenient manner, as for example by recrystallization from a convenient solvent, for example acetone. The purified product comprises colorless crystals melting at 169°–169.5° C., which on analysis were found to contain 19.90% sulfur and 4.25% nitrogen. It is believed the reaction takes place as indicated below:

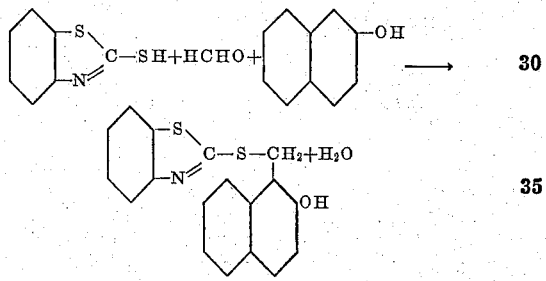

The product obtained as described was incorporated in a rubber stock comprising

| | Parts |
|---|---|
| Pale crepe rubber | 100 |
| Zinc oxide | 5 |
| Sulfur | 3 |
| Stearic acid | 1 |
| Reaction product of substantially equimolecular proportions of mercapto-benzothiazole, formaldehyde and beta naphthol | 1 |

The rubber stock so obtained was vulcanized by heating for different periods of time at the temperature of 20 pounds of steam pressure per square inch. The tests on the cured rubber product follow in Table I.

Table I

| Cure time in minutes | Modulus of elasticity in lbs./in.² at elongations of— | | Tensile at break in lbs./in.² | Ult. elong., percent |
|---|---|---|---|---|
| | 500% | 700% | | |
| 30 | No cure | | | |
| 45 | 72 | 167 | 776 | 980 |
| 60 | 115 | 435 | 1,945 | 975 |
| 90 | 208 | 950 | 2,590 | 880 |

The data set forth above show that the new and preferred class of accelerators, for example the reaction product obtainable by reacting substantially equi-molecular proportions of mercapto-benzo-thiazole, formaldehyde and beta naphthol possess desirable accelerating properties. Moreover, the above uncured stock showed no "setup" or prevulcanization as determined by the Williams Plastometer described by Williams, Industrial and Engineering Chemistry for 1924 (vol. 16, page 362—see also Krall, ibid, vol. 16, page 922) on heating for 360 minutes at 200° F.

As a specific example of the use of organic nitrogen containing accelerators in conjunction with the new accelerators of the present invention a rubber stock was compounded comprising

| | Parts |
|---|---|
| Pale crepe rubber | 100 |
| Zinc oxide | 5 |
| Sulfur | 3 |
| Stearic acid | 1 |
| Reaction product of substantially equi-molecular proportions of mercapto-benzothiazole, formaldehyde and beta naphthol | 0.80 |
| Diphenyl guanidine phthalate | 0.20 |

The compounded rubber stock was vulcanized by heating for different periods of time at the temperature of 20 pounds of steam pressure per square inch. The tensile and modulus figures obtained on the cured rubber product follow in Table II.

Table II

| Cure time, mins. | Modulus of elasticity in lbs./in.² at elongations of— | | Tensile at break in lbs./in.² | Ult. elong., percent |
|---|---|---|---|---|
| | 500% | 700% | | |
| 30 | 254 | 1,055 | 2,810 | 870 |
| 45 | 497 | 2,350 | 3,700 | 790 |
| 60 | 627 | 2,875 | 4,445 | 790 |
| 90 | 737 | 3,405 | 4,400 | 750 |

In the above rubber mix employing diphenyl guanidine phthalate in conjunction with the preferred class of compounds, the uncured stock showed no "setup" as determined by the Williams plastometer described above, on heating for 300 minutes at 200° F.

As a further example of the use of the preferred class of compounds with activating accelerators, a tread stock was compounded comprising

| | Parts |
|---|---|
| Smoked sheet rubber | 100 |
| Carbon black | 50 |
| Zinc oxide | 5 |
| Sulfur | 3 |
| Stearic acid | 3 |
| Pine tar | 2 |
| Reaction product of substantially equi-molecular proportions of mercapto-benzothiazole, formaldehyde and beta naphthol | 0.8 |
| Diphenyl guanidine | 0.2 |

The tensile and modulus figures obtained on the vulcanized rubber product follow in Table III.

Table III

| Cure | | Modulus of elasticity in lbs./in.² at elongations of— | | Tensile at break in lbs./in.² | Ult. elong., percent |
|---|---|---|---|---|---|
| Time, mins. | Pounds, steam pressure | 200% | 400% | | |
| 45 | 30 | 778 | 2,190 | 3,740 | 590 |
| 60 | 30 | 855 | 2,385 | 4,035 | 580 |
| 75 | 30 | 933 | 2,630 | 4,020 | 560 |
| 90 | 30 | 990 | 2,670 | 4,100 | 560 |

The preferred compounds of the present invention possess the further advantage of imparting a glossy finish to stocks cured in the dry heater. Stocks were compounded comprising

| | Stock A | Stock B |
|---|---|---|
| | Parts | Parts |
| Pale crepe rubber | 100 | 100 |
| Zinc oxide | 5 | 5 |
| Whiting | 60 | 60 |
| Sulfur | 2 | 2 |
| Laurex | 0.25 | 0.25 |
| Reaction product of substantially equi-molecular proportions of mercapto-benzo-thiazole, formaldehyde and beta naphthol | 1.30 | 1.30 |
| Diphenyl guanidine phthalate | 0.75 | |
| Diphenyl guanidine acetate | | 0.75 |

The stocks so compounded were cured by heating in the dry heater for 45 and 60 minutes at 260° F. The cured rubber products were found to be glossy in appearance and not materially discolored, thus rendering the preferred products very desirable for use in the manufacture of bathing caps, white rubber tennis shoes, and the like.

Further specific embodiments of the present invention comprise the reaction products obtainable by reacting substantially equi-molecular proportions of mercapto-benzo-thiazole, formaldehyde and 8-hydroxy quinoline designated as accelerator A, comprising a powder melting at 185–195° C.; reaction product obtainable by reacting substantially equi-molecular proportions of mercapto-benzo-thiazole, formaldehyde and 3-hydroxy 2-naphthoic acid, designated as accelerator B, comprising a solid melting above 220° C.; and reaction product obtainable by reacting substantially equi-molecular proportions of mercapto-benzo-thiazole, formaldehyde and alpha naphthol, designated as accelerator C, comprising a solid melting at 230° to 231° C., which were prepared in a manner analogous to that given above for Example I. The reactions involved in the preparation of said products may likewise, it is believed, be expressed in a manner analogous to that given for Example I.

The products, prepared as described above, were compounded in rubber stocks comprising

| | Stock A | Stock B | Stock C |
|---|---|---|---|
| | Parts | Parts | Parts |
| Pale crepe rubber | 100 | 100 | 100 |
| Zinc oxide | 5 | 5 | 5 |
| Sulfur | 3 | 3 | 3 |
| Stearic acid | 1 | 1 | 1 |
| Diphenyl guanidine phthalate | 0.4 | 0.4 | 0.4 |
| Accelerator A | 0.6 | | |
| Accelerator B | | 0.6 | |
| Accelerator C | | | 0.6 |

The stocks so compounded were vulcanized at the temperature of 20 pounds of steam pressure with the following results:

Table IV

| Accelerator | Cure, mins. | Modulus of elasticity in lbs./in.² at elongations of— | | Tensile at break in lbs./in.² | Ult. elong., percent |
|---|---|---|---|---|---|
| | | 500% | 700% | | |
| A | 30 | 142 | 464 | 1660 | 935 |
| B | 30 | 118 | 391 | 1450 | 940 |
| C | 30 | 206 | 1003 | 2370 | 845 |
| A | 45 | 251 | 1080 | 2570 | 845 |
| B | 45 | 226 | 928 | 2210 | 855 |
| C | 45 | 407 | 2025 | 3720 | 810 |
| A | 60 | 385 | 1605 | 3030 | 810 |
| B | 60 | 334 | 1355 | 2655 | 825 |
| C | 60 | 833 | 3630 | 3960 | 715 |
| A | 90 | 546 | 2435 | 3430 | 755 |
| B | 90 | 465 | 2105 | 3095 | 765 |
| C | 90 | 1133 | 4355 | 4710 | 725 |

From the data hereinbefore set forth, it is apparent that the preferred class of materials constitute an important class of rubber vulcanization accelerators, particularly when employed in conjunction with a nitrogen containing accelerator as an activator thereof.

If convenient or desirable other methods of producing the compounds of the invention may be employed as is obvious to those skilled in the art.

The present invention is not limited to the specific examples hereinbefore set forth wherein the preferred accelerators are employed. Other ratios of the compounding ingredients than those mentioned in the examples as well as other well-known fillers, pigments and the like may be employed in the production of various types of rubber compounds, and are apparent to those skilled in the art to which this invention pertains. The present invention is limited solely by the following claims.

What is claimed is:

1. The process of vulcanizing rubber which comprises heating rubber and sulfur in the presence of a vulcanization accelerator possessing the structural formula of

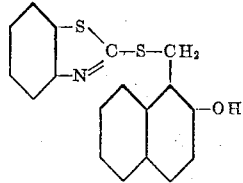

2. The vulcanized rubber product prepared by heating rubber and sulfur in the presence of a vulcanization accelerator possessing the structural formula of

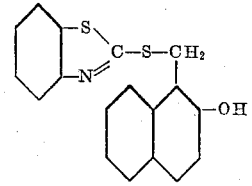

3. The process of vulcanizing rubber which comprises heating rubber and sulfur in the presence of a vulcanization accelerator possessing the structural formula of R'—S—CH$_2$—R, where R is a polynuclear aromatic hydroxide selected from the naphthalene and quinoline series, and where R' is an aryl thiazyl radical, of the benzene and naphthalene series.

4. The process of vulcanizing rubber which comprises heating rubber and sulfur in the presence of a vulcanization accelerator possessing the structural formula of R'—S—CH$_2$—R, where R is a hydroxy substituted naphthalene radical, and where R' is an aryl thiazyl radical, of the benzene and naphthalene series.

5. The process of vulcanizing rubber which comprises heating rubber and sulfur in the presence of a vulcanization accelerator possessing the structural formula of R'—S—CH$_2$—R where R is a polynuclear aromatic hydroxide selected from the naphthalene and quinoline series, and where R' is an aryl thiazyl radical, of the benzene and naphthalene series, and in addition thereto a nitrogen containing vulcanization accelerator.

6. The process of vulcanizing rubber which comprises heating rubber and sulfur in the presence of a vulcanization accelerator possessing the structural formula of R'—S—CH$_2$—R where R is a hydroxy substituted naphthalene radical, and where R' is an aryl thiazyl radical, of the benzene and naphthalene series, and in addition thereto a nitrogen containing vulcanization accelerator.

7. The process of vulcanizing rubber which comprises heating rubber and sulfur in the presence of a vulcanization accelerator possessing the structural formula of R'—S—CH$_2$—R where R is a hydroxy substituted naphthalene radical, and where R' is an aryl thiazyl radical of the benzene and naphthalene series, and in addition thereto a salt of diphenyl guanidine.

8. The vulcanized rubber product prepared by heating rubber and sulfur in the presence of a vulcanization accelerator possessing the structural formula of R'—S—CH$_2$—R where R is a polynuclear aromatic hydroxide selected from the naphthalene and quinoline series, and where R' is an aryl thiazyl radical, of the benzene and naphthalene series.

9. The vulcanized rubber product prepared by heating rubber and sulfur in the presence of a vulcanization accelerator possessing the structural formula of R'—S—CH$_2$—R where R is a hydroxy substituted naphthalene radical, and where R' is an aryl thiazyl radical, of the benzene and naphthalene series.

10. The vulcanized rubber product prepared by heating rubber and sulfur in the presence of a vulcanization accelerator possessing the structural formula of R'—S—CH$_2$—R where R is a polynuclear aromatic hydroxide selected from the naphthalene and quinoline series, and where R' is an aryl thiazyl radical, of the benzene and naphthalene series, and in addition thereto a nitrogen containing vulcanization accelerator.

11. The vulcanized rubber product prepared by heatng rubber and sulfur in the presence of a vulcanization accelerator possessing the structural formula of R'—S—CH$_2$—R where R is a hydroxy substituted naphthalene radical and where R' is an aryl thiazyl radical, of the benzene and naphthalene series, and in addition thereto a guanidine accelerator.

MARION W. HARMAN.